June 8, 1971 L. P. FRIEDER 3,582,990
BALLISTIC COVER FOR PROTECTIVE HELMET
Filed Oct. 7, 1969 5 Sheets-Sheet 1

INVENTOR.
Leonard P. Frieder
BY
Shenier & O'Connor
ATTORNEYS

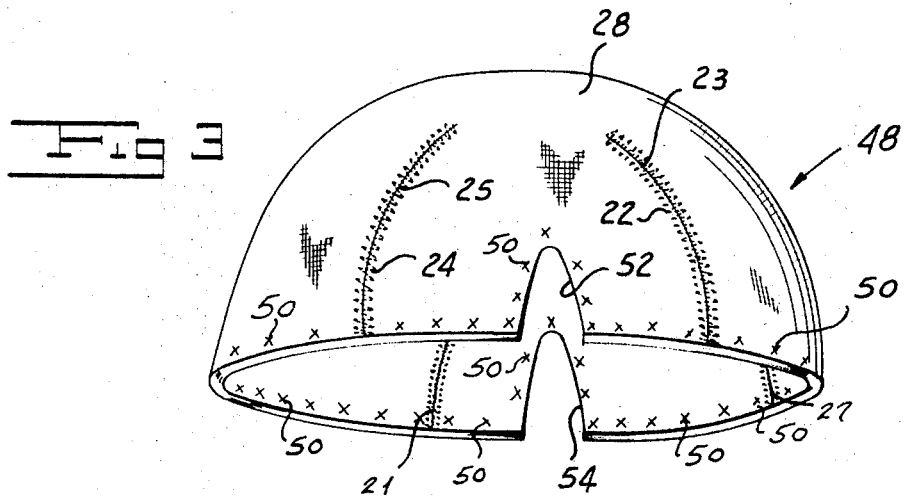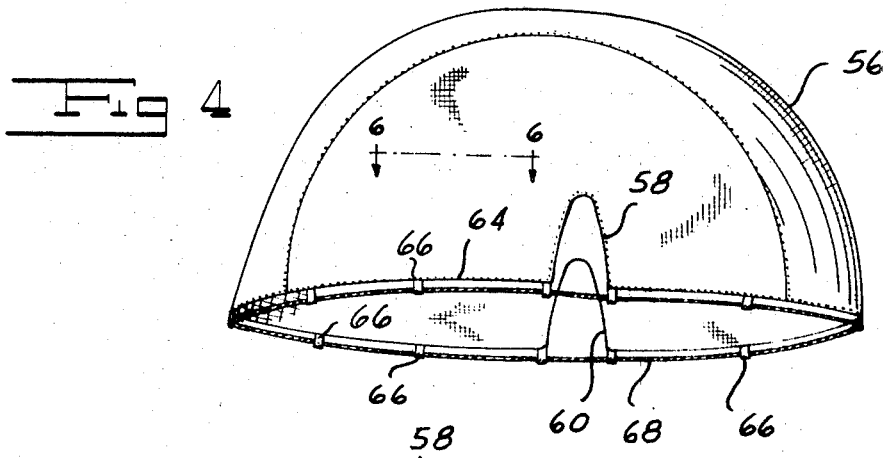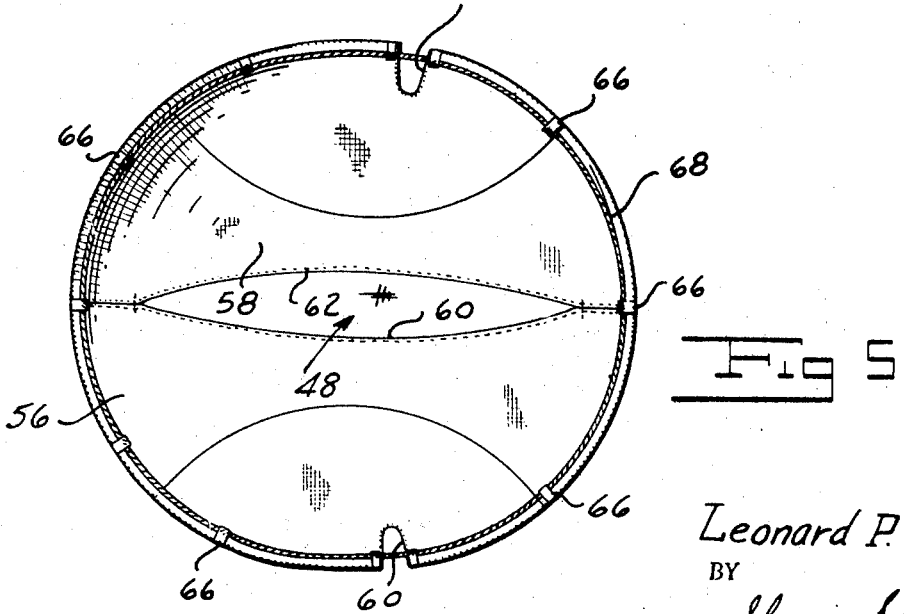

June 8, 1971  L. P. FRIEDER  3,582,990
BALLISTIC COVER FOR PROTECTIVE HELMET
Filed Oct. 7, 1969  5 Sheets-Sheet 3
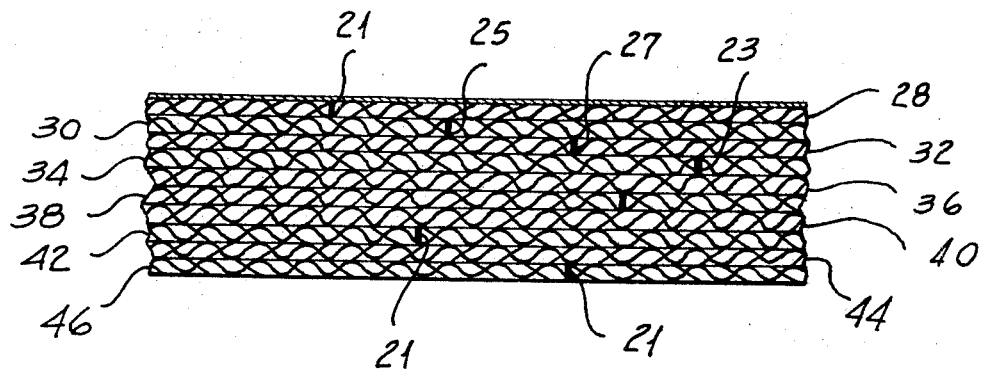
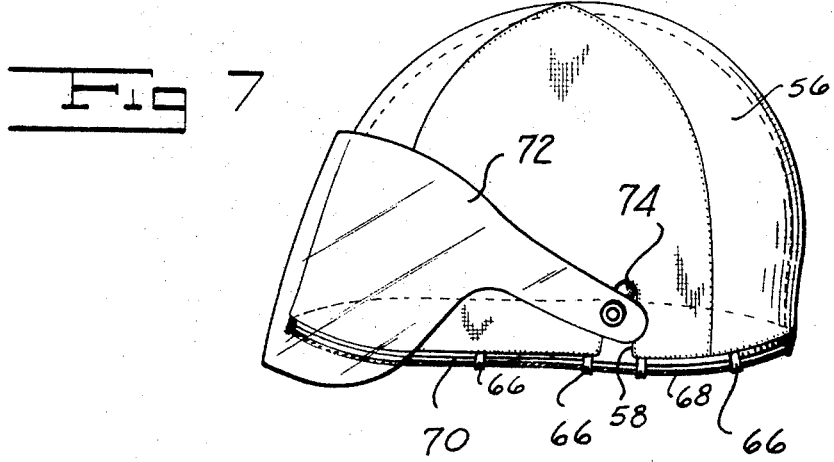
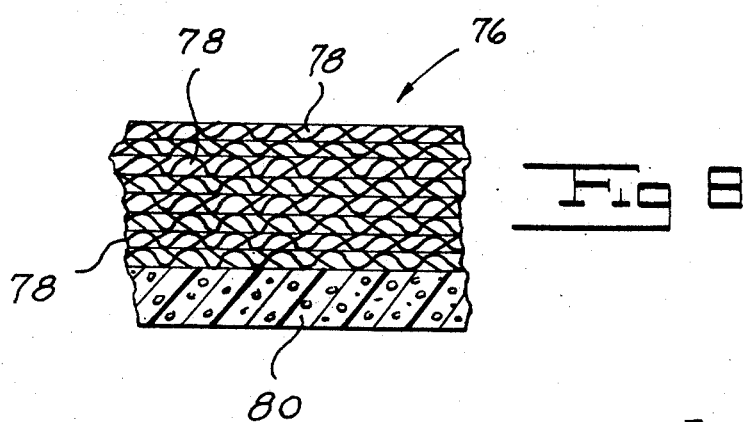
INVENTOR.
*Leonard P. Frieder*
BY
*Shenier & O'Connor*
ATTORNEYS June 8, 1971  L. P. FRIEDER  3,582,990
BALLISTIC COVER FOR PROTECTIVE HELMET
Filed Oct. 7, 1969  5 Sheets-Sheet 4
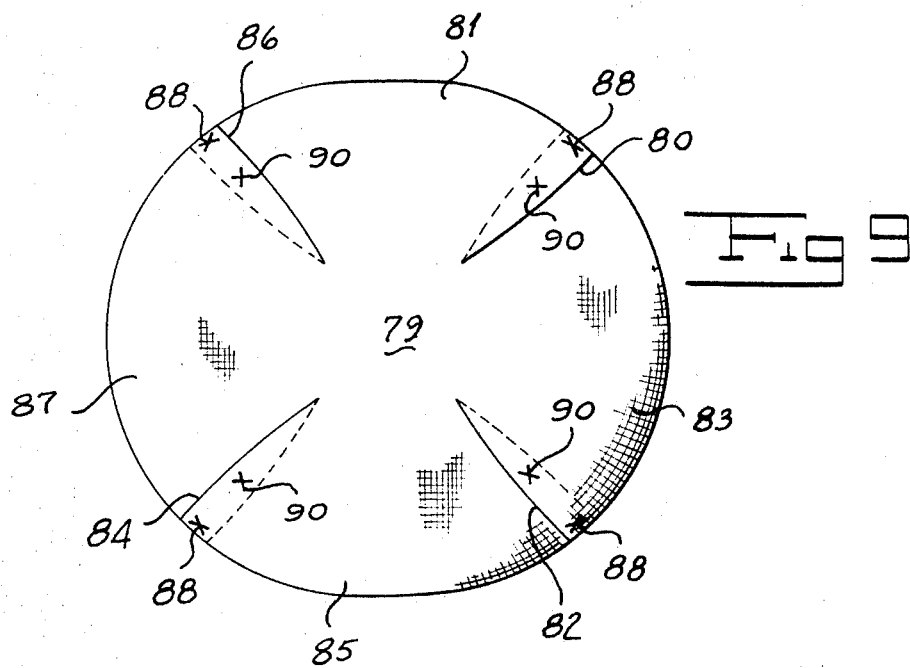
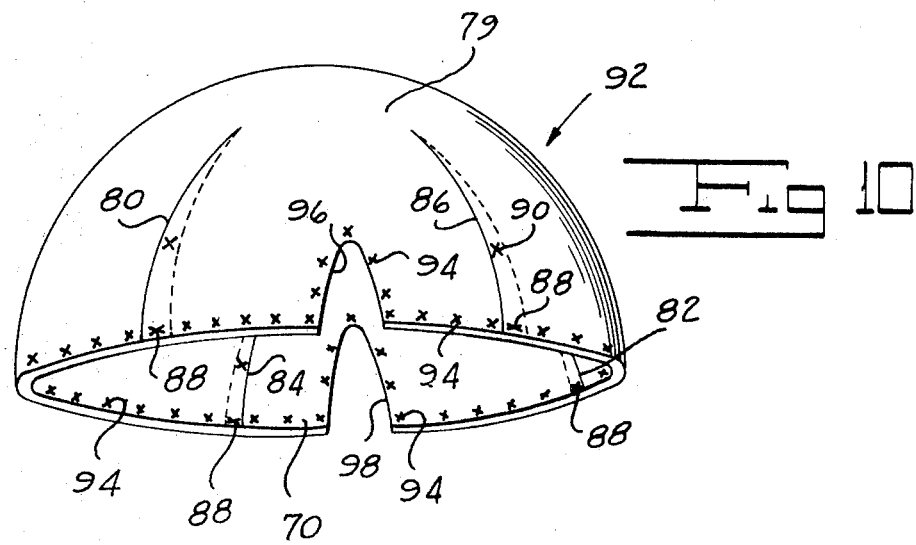
INVENTOR.
Leonard P. Frieder
BY
Shenier & O'Connor
ATTORNEYS June 8, 1971  L. P. FRIEDER  3,582,990
BALLISTIC COVER FOR PROTECTIVE HELMET
Filed Oct. 7, 1969  5 Sheets-Sheet 5

INVENTOR.
Leonard P. Frieder
BY
Shenier & O'Connor
ATTORNEYS

United States Patent Office 3,582,990
Patented June 8, 1971

3,582,990
BALLISTIC COVER FOR PROTECTIVE HELMET
Leonard P. Frieder, Clarks Green, Pa., assignor to
Gentex Corporation, New York, N.Y.
Filed Oct. 7, 1969, Ser. No. 864,319
Int. Cl. A42b 3/00
U.S. Cl. 2—6
15 Claims

ABSTRACT OF THE DISCLOSURE

A ballistic cover for a protective helmet in which a plurality of laminates of woven ballistic cloth which are individually cut and sewed to conform to the shape of the helmet are tacked together around their peripheries to form an assembly with seams of the individual laminates out of line. A light fabric envelope covering cut and sewed to the shape of the helmet receives the ballistic fabric assembly and carries means for removably securing it to the helmet with which it is to be used. It may provide an inner laminate of impact absorbing foam for the assembly.

BACKGROUND OF THE INVENTION

Various forms of protective helmets are known in the prior art. Most of the up-to-date helmets of this type are hard shells molded from synthetic resin and provided with suspensions by means of which the shell is supported upon the wearer's head. These helmets provide satisfactory protection under most conditions wherein they are used. For example, in riot control they will protect the wearer against most thrown objects and against weapons such as clubs or the like. While they provide protection against such instruments, they do not protect the wearer under more extreme conditions wherein he is subjected to possible injury by high velocity fragments of home-made bombs or the like and of small arms fire.

I have invented a ballistic cover for protective helmets which may be applied to a helmet to afford the wearer protection against injury by high velocity missiles. My cover is readily adapted to use with most existing protective helmets. It is readily attached to and detached from the hard shell of the helmet. It is extremely lightweight for the result achieved thereby. It is simple in construction.

SUMMARY OF THE INVENTION

One object of my invention is to provide a ballistic cover for a protective helmet to render the helmet resistant to penetration by high velocity missiles.

Another object of my invention is to provide a ballistic cover for protective helmets which is adaptable to most existing helmets.

A further object of my invention is to provide a ballistic cover for a protective helmet which is readily assembled on and detached from a protective helmet.

A still further object of my invention is to provide a lightweight ballistic cover for a protective helmet.

Other and further objects of my invention will appear from the following description:

In general my invention contemplates the provision of a ballistic cover for a protective helmet in which an envelope of relatively light fabric cut and sewed to the shape of the helmet receives an assembly of a plurality of laminates of woven ballistic fabric individually cut and sewed to the shape of the helmet and tacked together around their peripheries with their seams out of line to form the assembly. The envelope carries means for readily detachably mounting the cover on the hard shell of the helmet. The assembly may include an inner laminate of impact absorbing foam.

BRIEF DESCRIPTION OF THE DRAWINGS

In the accompanying drawings which form part of the instant specification and which are to be read in conjunction therewith and in which like reference numerals are used to indicate like parts in the various views:

FIG. 8 is a perspective view of an assembly of laminates of ballistic fabric which is used in my ballistic cover for protective helmets.

FIG. 4 is a perspective view of my ballistic cover for protective helmets.

FIG. 5 is a bottom plan view of the form of my ballistic cover for protective helmets illustrated in FIG. 4.

FIG. 6 is a fragmentary sectional view of my ballistic cover for protective helmets taken along the line 6—6 of FIG. 4 and drawn on an enlarged scale.

FIG. 7 is a perspective view of a protective helmet to which my ballistic cover has been applied.

FIG. 8 is a fragmentary sectional view of an alternate form of the protective assembly of my ballistic cover for protective helmets.

FIG. 9 is a top plan view of an alternate form of laminate which I may use in my ballistic cover for protective helmets.

FIG. 10 is a side elevation of an assembly of the form of my laminates shown in FIG. 9.

DESCRIPTION OF THE PREFERRED EMBODIMENT

Figure 1:
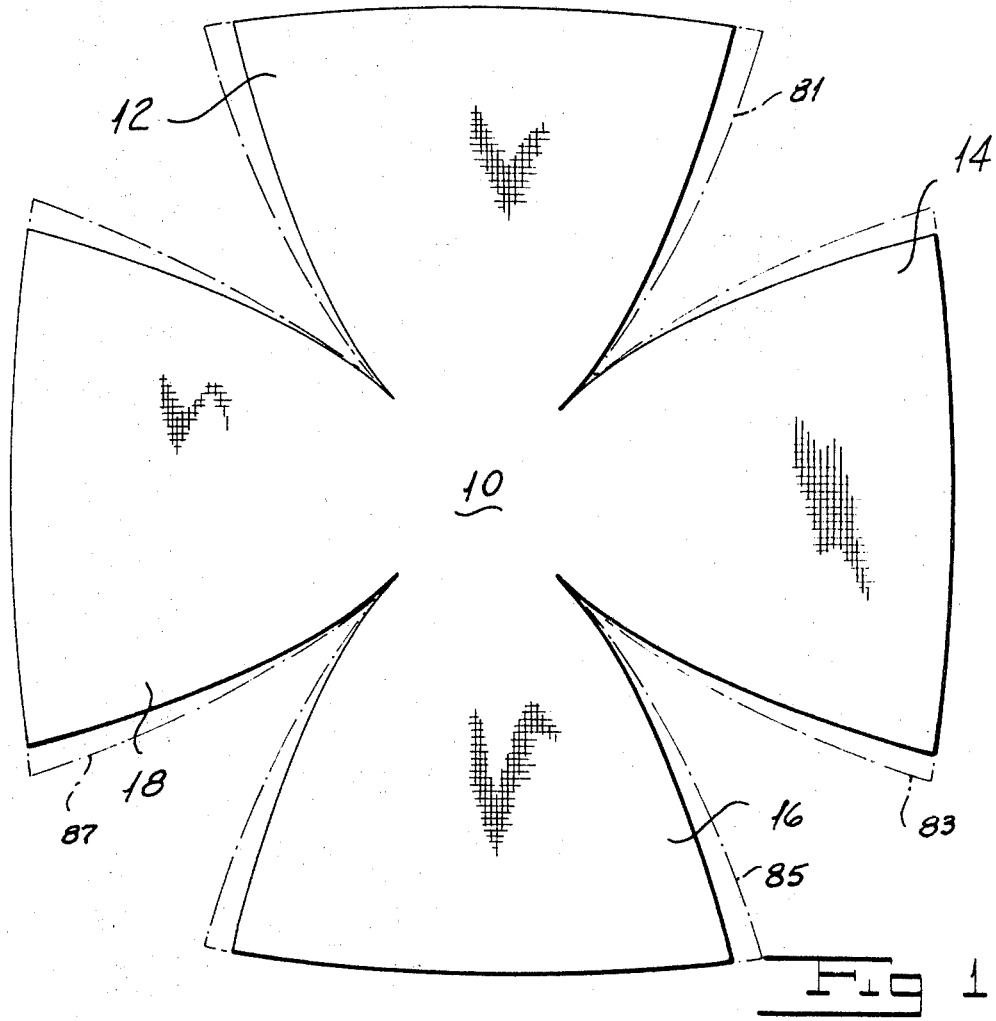
FIG. 1 is a plan view of a piece of ballistic fabric which has been cut to the shape of a laminate of my ballistic cover before sewing.
Figure 2:
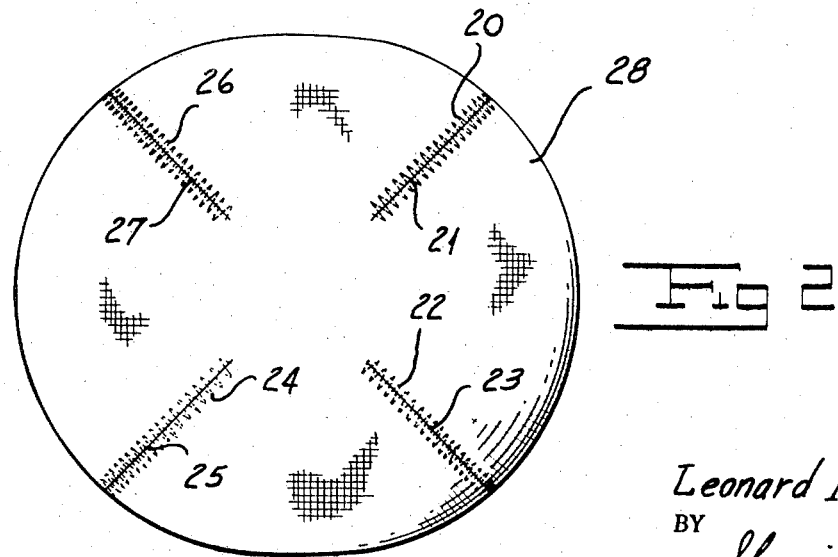
FIG. 2 is a top plan view of a laminate of my ballistic cover which has been sewed to conform to the shape of a helmet with which it is used.

Referring now to the drawings I cut a blank 10 of ballistic fabric to form a plurality of sections 12, 14, 16 and 18 in making one laminate of my ballistic cover. The ballistic material from which the blank 10 is cut may be of any suitable type known to the art. Preferably I employ a woven ballistic fabric the individual yarns of which are made up of a plurality of nylon filaments and which yarns are twisted so as to have a pre-determined number of convolutions per unit length to tension the individual filaments to within a certain percentage of their ultimate elongation. One type of fabric is disclosed in Frieder et al. Pat. 2,789,076. Since fabrics of this type do not per se form part of my invention, they will not be described in greater detail. Having cut the blank 10 I next sew adjacent edges of the sections 12 and 14, 14 and 16, 16 and 18 and 18 and 12 with lines of stitching 20, 22, 24 and 26 along respective seams 21, 23, 25 and 27 to form one laminate 28 of my ballistic cover. By way of example, laminate 28 may be the outer laminate of my ballistic cover.

Having formed a number of other laminates 30, 32, 34, 36, 38, 40, 42, 44 and 46 in a manner similar to that in which laminate 28 was formed, I next secure all the laminates together to form an assembly indicated generally by the reference character 48 of the plurality of laminates to ballistic fabric which have been individually cut and sewed to the shape of a helmet. I may employ any suitable means known to the art for holding the laminates in assembled relationship. For example, I may tack the laminates together at a plurality of stitched points 50 all around the periphery of the assembly 48. It is to be noted that in so securing the laminates together to form the assembly 48 I randomly stagger the seams of the individual laminates with respect to each other thus avoiding the possibility of any localized weak points in the structure. Either before or after tacking the laminates to form the assembly 48 I cut respective recesses 52 and 54 in the assembly to accommodate means such as visor mounting brackets, to be described hereinafter, present on the helmet.

My ballistic cover for protective helmets includes a pieced and sewed envelope 56 which may be made of any suitable material such for example as nylon taffeta. In forming the envelope 56 I provide recesses 58 and 60 which conform to the recesses 52 and 54 provided in the assembly 48. The interior of the envelope 56 is formed with a slit 62 providing flaps 58 and 60 which can be separated to permit the assembly 48 to be inserted within the envelope.

I provide the envelope 56 with means for releasably securing my ballistic cover to a helmet with which it is to be used. The peripheral stitching 64 of the cover 56 holds a plurality of fabric loops 66 to the cover 56 at spaced locations around the edge thereof. These loops 66 receive a continuous cord 68 having just enough resilience and tension therein so as securely to hold the cover on a helmet. Preferably I employ a spliced pretensioned braided cord. It will readily be appreciated that this cord might be made adjustable if desired by any expedient known to the art.

One form of helmet 70 with which my ballistic cover might be used comprises a hard shell which may be molded from any suitable relatively rigid synthetic resin, such for example, as a polycarbonate resin. Most helmets of this type are provided with retractable transparent protective visors 72 pivotally supported on brackets 74 attached to the helmet. Helmets of this type may also be provided with an inner suspension (not shown) and with a cushion liner (not shown). It will be appreciated that where my protective cover is used with a helmet such as the helmet 70 the openings 58 and 60 accommodate brackets 74.

Referring now to FIGS. 1, 9 and 10 in an alternate form of laminate construction 79 I may cut the blank 10 to form laminate sections 81, 83, 85 and 87 which overlap along seams 80, 82, 84 and 86 when formed to the shape of the helmet contour. In this form of my laminate I tack the overlapping portions of each seam together with a first tacking stitch at the bottom edge and with it a second tacking stitch 90 at approximately the middle of the seam. I have found that one tacking stitch at each spot is generally sufficient to prevent excessive spreading of the seam edges when the laminates are stacked to form an assembly, indicated generally by the reference character 92. In forming the assembly 92 of a number of laminates 79 I stagger the overlapping seams of each laminate with respect to those of adjacent laminates to avoid weak spots. I also spot tack the assembly of laminates at suitable locations such as around the edge thereof by stitches 94 to ensure that the laminates retain their relative positions. It is to be understood that the laminates are provided with registering openings which form openings 96 and 98 similar to openings 58 and 60 in the assembly 92. This arrangement ensures adequate protection along the seams. It minimizes the hazard of wrinkles and that of a gap at the seam edge.

Figure 11:
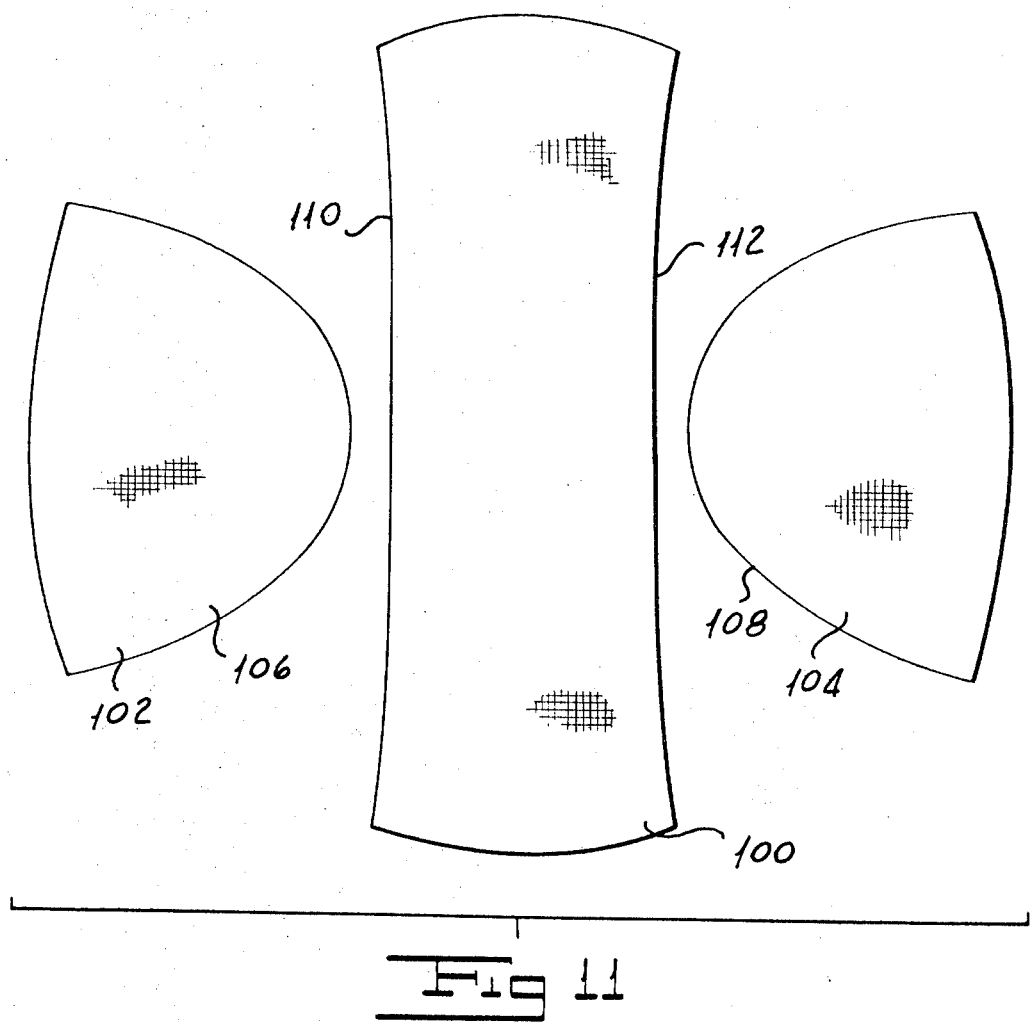
FIG. 11 is a plan view of fabric blanks which are employed in making up an alternate form of laminate which I may use in my ballistic cover for protective helmets.
Figure 12:
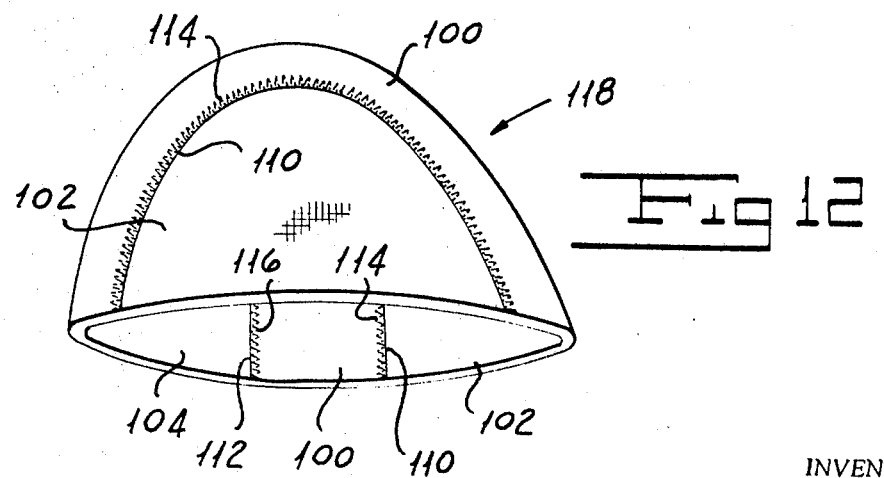
FIG. 12 is a perspective view of an assembly of laminates each of which is formed from blanks shown in FIG. 11.

Referring now to FIGS. 11 and 12 in an alternate form of laminate which I may use in making up my ballistic cover for protective helmets I cut a center blank 100 and respective side blanks 102 and 104 from a suitable ballistic fabric similar to that of which the laminates in the other forms of my helmet are formed. Blanks 102 and 104 are adapted to be joined along their respective edges 106 and 108 to the lateral edges 110 and 112 of the center blank 100 with the edges slightly overlapping to form one laminate of my ballistic cover. Preferably I employ zig-zag stitching lines 114 and 116 to achieve this purpose.

FIG. 12 illustrates an assembly, indicated generally by the reference character 118 of laminates made from blanks as shown in FIG. 11. This assembly may be held together by any suitable means such as the tacking stitches described hereinabove in connection with other forms of the cover. I may use the same envelope as that described hereinabove to house the assembly 118. Preferably the seams of respective laminates are staggered each with respect to the other.

The blanks of FIG. 11 are so cut as to facilitate formation of a laminate of the appropriate contour. If necessary other cuts might be made but preferably I use the cuts shown.

While I have illustrated an assembly 48 comprising 10 laminates of ballistic fabric it may be, depending upon the conditions to be encountered and the particular ballistic fabric employed, a greater or lesser number of laminates will be required. Alternatively, an assembly indicated generally by the reference character 76 comprising a plurality of ballistic fabric laminates 78 and an inner cushion laminate 80 will provide superior results. The cushion 80 is formed of any suitable energy-absorbing mamaterial such for example as expanded polyvinyl foam.

In use of my ballistic cover with the helmet 70 for example the cover is placed over the helmet with the openings 58 and 60 registering with brackets 74 and the cord 68 is drawn over the lower edge of the helmet 70. Owing to the tension in the cord it draws the cover down over the helmet shell securely to hold it in place. In one actual test of my cover wherein an assembly 48 comprising 10 laminates of ballistic fabric was used nine hits were made on the helmet which was supported on a Styrofoam support and held in place with a bolt. The shots were fired at a range of from 25 to 30 feet from a .38 calibre Smith and Wesson Special using Western 38 Special 158 grain Lubaloy nickel-plated cartridges. None of the cartridges penetrated to the Styrofoam support. Other tests with the form of my assembly shown in FIG. 8 demonstrated the high penetration resistance of a cover incorporating this assembly.

It will be seen that I have accomplished the objects of my invention. I have provided a ballistic cover for a protective helmet which renders the helmet resistant to penetration by high velocity missiles. My cover is readily attached to and is readily removed from a helmet with which it is to be used. My cover is adaptable to most existing helmets. It is light in weight for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A ballistic cover for a protective helmet including in combination, an assembly of a plurality of laminates of ballistic fabric, said assembly conforming to the exterior shape of said helmet, an envelope for receiving and retaining said assembly and means on said envelope for readily removably attaching said cover to the exterior of said helmet in nested relation therewith.

2. A cover as in claim 1 in which each of said laminates is a blank cut and stitched to the shape of said helmet.

3. A cover as in claim 1 including tacking stitches for holding said laminates in assembled relationship.

4. A cover as in claim 1 in which said laminates are individually cut and stitched from ballistic fabric blanks to form said laminate with seams, and in which said assembly includes means for holding said blanks assembled with said seams of respective laminates out of line with each other.

5. A cover as in claim 1 in which said laminates are individually cut from flat blanks of ballistic fabric, and in which said assembly includes means forming seams along cut portions of said blanks to conform said blanks to the shape of said helmet, and tacking stitches for holding said laminates in assembled relationship with the seams of respective laminates out of line with each other.

6. A cover as in claim 1 in which said assembly includes an inner laminate of energy absorbing foam.

7. A cover as in claim 1 in which said assembly includes an inner laminate of impact-absorbing polyvinyl foam.

8. A cover as in claim 1 in which said helmet has a peripheral lip, and in which said means for attaching said cover to said helmet comprises a length of tensioned resilient material adapted to be slipped over said lip.

9. A cover as in claim 1 in which said envelope is formed with an interior slit to permit said assembly to be removably inserted therein.

10. A ballistic cover for a protective helmet including in combination, a plurality of laminates of ballistic fabric, each of said laminates being cut from a flat ballistic fabric blank and being sewed along seams to conform to the shape of said helmet, means for tacking said laminates together at points around the periphery thereof to hold said laminates in assembled relationship with the seams of the respective laminates out of alignment with each other, an envelope formed in the shape of said helmet for receiving and retaining the assembled laminates, and means carried by said envelope for detachably mounting said cover on said helmet.

11. A cover as in claim 10 including an inner laminate of impact absorbing expanded foam.

12. A cover as in claim 10 in which said mounting means comprises a tensioned resilient cord adapted to be slipped over the peripheral edge of said helmet.

13. A cover as in claim 10 in which portions of each of said laminates overlap at said seams.

14. A cover as in claim 13 including a tacking stitch for retaining said portions in overlapping relationship.

15. A cover as in claim 10 in which each laminate comprises a central piece and side pieces cut from said blank, said central piece having lateral edges and said side pieces having curved edges, said sewing joining the curved edges of the side pieces of the lateral edges of said center piece.

References Cited

UNITED STATES PATENTS

| | | | |
|---|---|---|---|
| 2,381,524 | 8/1945 | Taylor | 2—7 |
| 2,532,442 | 12/1950 | Daly | 2—3R |
| 2,789,076 | 4/1957 | Frieder et al. | 2—2.5X |
| 3,018,210 | 1/1962 | Frieder et al. | 2—3RX |

JAMES R. BOLER, Primary Examiner

U.S. Cl. X.R.

2—187; 161—404